(12) United States Patent
Mizuno et al.

(10) Patent No.: US 8,518,583 B2
(45) Date of Patent: Aug. 27, 2013

(54) AIR CATHODE AND METAL-AIR BATTERY

(75) Inventors: Fuminori Mizuno, Toyota (JP); Peter George Bruce, Newport-on-Tay (GB)

(73) Assignees: Toyota Jidosha Kabushiki Kaisha, Toyota-shi (JP); The University Court of the University of St Andrews, St. Andrews (GB)

( * ) Notice: Subject to any disclaimer, the term of this patent is extended or adjusted under 35 U.S.C. 154(b) by 0 days.

(21) Appl. No.: 13/496,123

(22) PCT Filed: Sep. 18, 2009

(86) PCT No.: PCT/JP2009/066856
§ 371 (c)(1),
(2), (4) Date: Mar. 14, 2012

(87) PCT Pub. No.: WO2011/033683
PCT Pub. Date: Mar. 24, 2011

(65) Prior Publication Data
US 2012/0171594 A1   Jul. 5, 2012

(51) Int. Cl.
*H01M 4/13*   (2010.01)
(52) U.S. Cl.
USPC ..................................... 429/224; 429/218.1
(58) Field of Classification Search
USPC .............................. 429/224, 218.1
See application file for complete search history.

(56) References Cited

U.S. PATENT DOCUMENTS

| 5,108,852 A | 4/1992 | Tomantschger et al. |
| 2006/0001012 A1 | 1/2006 | Suzuki et al. |

FOREIGN PATENT DOCUMENTS

| JP | 58 32370 | 2/1983 |

OTHER PUBLICATIONS 1. http://www.merriam-webster.com/dictionary/catalyst.*
Ogasawara, T., et al., "Rechargeable $Li_2O_2$ Electrode for Lithium Batteries," Journal of the American Chemical Society, vol. 128, pp. 1390-1393, (Jan. 5, 2006).
Debart, A., et al., "α-$MnO_2$ Nanowires: A Catalyst for the $O_2$ Electrode in Rechargeable Lithium Batteries," Angewandte Chemie International Edition, vol. 47, pp. 4521-4524, (2008).
International Search Report Issued Dec. 3, 2009 in PCT/JP09/66856 Filed Sep. 18, 2009.

* cited by examiner

*Primary Examiner* — Helen O Conley
(74) *Attorney, Agent, or Firm* — Oblon, Spivak, McClelland, Maier & Neustadt, L.L.P.

(57) ABSTRACT

A main object of the present invention is to provide an air cathode capable of achieving both high initial discharge capacity and high capacity retention. In the present invention, the problem is solved by providing an air cathode used in a metal-air battery, comprising: an air cathode layer containing a conductive material, a particulate catalyst and a fibrous catalyst; and an air cathode current collector for collecting current of the air cathode layer, wherein the ratio of the fibrous catalyst to the total weight of the particulate catalyst and the fibrous catalyst is 10% by weight or less.

4 Claims, 3 Drawing Sheets

AIR CATHODE AND METAL-AIR BATTERY

TECHNICAL FIELD

The present invention relates to an air cathode capable of achieving both high initial discharge capacity and high capacity retention.

BACKGROUND ART

A metal-air battery is a battery wherein air (oxygen) is used as a cathode active material. The metal-air battery has advantages such as: the energy density is high; and the battery can be easily made small and light. At present, therefore, such battery attracts attention as high-capacity battery which excels widely used lithium ion batteries.

Such a metal-air battery comprises, for example, an air cathode layer having a conductive material (such as carbon black), a catalyst (such as manganese dioxide) and a binder (such as polyvinylidene fluoride), an air cathode current collector for collecting current of the air cathode layer, an anode layer containing an anode active material (such as metallic Li), an anode current collector for collecting current of the anode layer, and an electrolyte (such as nonaqueous electrolyte solution).

Conventionally, metal-air batteries using various catalysts have been known. For example, Non-Patent Document 1 discloses a nonaqueous electrolyte solution type lithium air battery wherein EMD (electrolyte manganese dioxide, $\gamma$-$MnO_2$) is used as a catalyst. Furthermore, the document discloses that this battery can give an initial discharge capacity of 1000 mAh/g-C, 50 charge-discharge cycles can be attained, and the capacity retention ($R_{10/1}$) after 10 cycles, with respect to the initial discharge capacity, is about 80%. Moreover, Non-Patent Document 2 discloses a nonaqueous electrolyte solution type lithium air battery wherein $\alpha$-$MnO_2$ in nano-wire form is used as a catalyst. Furthermore, the document discloses that this battery gives an initial discharge capacity of 3000 mAh/g-C. However, in the battery using $\alpha$-$MnO_2$ in nano-wire form, a large deterioration in capacity is caused while the battery is repeatedly charged and discharged. Thus, the capacity retention ($R_{10/1}$) after 10 cycles, with respect to the initial discharge capacity, is as low as about 50%.

PRIOR ART DOCUMENTS

Non-Patent Document

Non-Patent Document 1 Takeshi Ogasawara et al., "Rechargeable $Li_2O_2$ Electrode for Lithium Batteries", J. Am. Chem. Soc. 2006, 128, 1390-1393

Non-Patent Document 2 Aurelie Debart et al., "$\alpha$-$MnO_2$ Nanowires: A Catalyst for the $O_2$ Electrode in Rechargeable Lithium Batteries", Angew. Chem. Int. Ed. 2008, 47, 4521-4524

DISCLOSURE OF THE INVENTION

Problems to be Solved by the Invention

Since a trade-off relationship exists between the initial discharge capacity and the capacity retention, it is difficult to realize the both in high value. In light of this situation, the present invention has been made. A main object thereof is to provide an air cathode capable of achieving both high initial discharge capacity and high capacity retention.

Means for Solving the Problems

In order to attain the object, the present invention provides an air cathode used in a metal-air battery, comprising: an air cathode layer containing a conductive material, a particulate catalyst and a fibrous catalyst; and an air cathode current collector for collecting current of the air cathode layer, wherein the ratio of the fibrous catalyst to the total weight of the particulate catalyst and the fibrous catalyst is 10% by weight or less.

According to the present invention, by setting the ratio of the fibrous catalyst to the above-mentioned range, both high initial discharge capacity and high capacity retention can be achieved. This makes it possible to obtain an air cathode that can be used at high energy density for a long term.

In the above-mentioned invention, the ratio of the fibrous catalyst to the total weight of the particulate catalyst and the fibrous catalyst is preferably within the range of 2% by weight to 9% by weight. Thereby, the initial discharge capacity and the capacity retention can be achieved at higher value.

In the above-mentioned invention, the particulate catalyst is preferably $\gamma$-$MnO_2$, and the fibrous catalyst is preferably $\alpha$-$MnO_2$. This is because their catalyst functions are excellent. In particular, $\alpha$-$MnO_2$ has advantages that it is high in shape-selectivity so that fiber can be easily obtained.

Further, the present invention also provides a metal-air battery, comprising: the above-mentioned air cathode; an anode having an anode layer containing an anode active material, and an anode current collector for collecting current of the anode layer; and an electrolyte for conducting metal ions between the air cathode layer and the anode layer.

According to the present invention, the use of the above-mentioned air cathode makes it possible to obtain a metal-air battery which can be used at a high energy density for a long term.

BEST MODE FOR CARRYING OUT THE INVENTION

The air cathode and the metal-air battery of the present invention will be described in detail hereinafter.

A. Air Cathode

First, the air cathode of the present invention is described. The air cathode of the present invention is an air cathode used in a metal-air battery, comprising: an air cathode layer containing a conductive material, a particulate catalyst and a fibrous catalyst; and an air cathode current collector for collecting current of the air cathode layer, wherein the ratio of the fibrous catalyst to the total weight of the particulate catalyst and the fibrous catalyst is 10% by weight or less.

Figure 1:
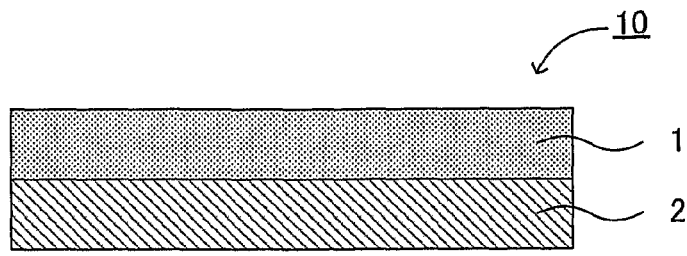
FIG. 1 is a schematic sectional view showing an example of the air cathode of the present invention.

FIG. 1 is a schematic sectional view showing an example of the air cathode of the present invention. An air cathode 10 shown in FIG. 1 comprises: an air cathode layer 1 containing a conductive material, a particulate catalyst and a fibrous catalyst; and an air cathode current collector 2 for collecting current of the air cathode layer 1. Furthermore, the present invention is largely characterized in that the content of the fibrous catalyst in the air cathode layer 1 is within the specific range.

Figure 2A:
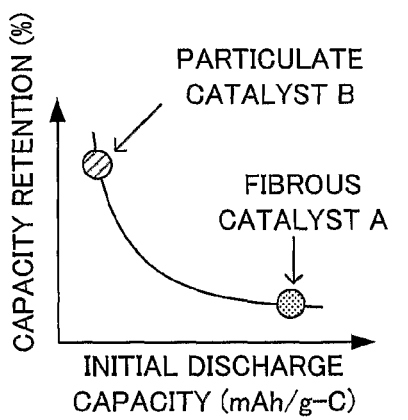
FIGS. 2A to 2C are each an explanatory view describing the air cathode of the present invention.
Figure 2B:
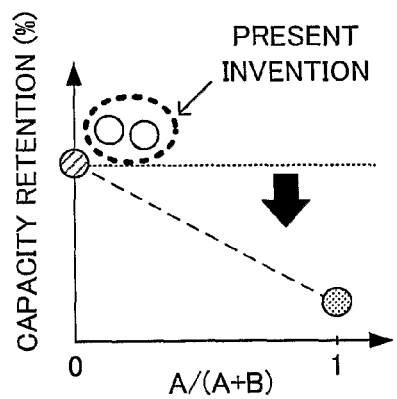
Figure 2C:
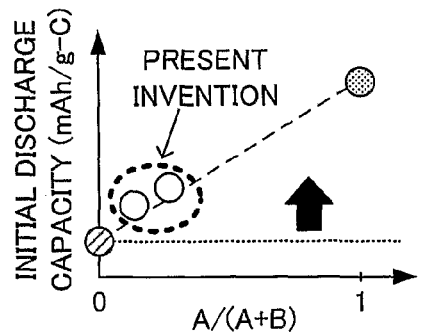

FIGS. 2A to 2C are each an explanatory view describing the air cathode of the present invention. As shown in FIG. 2A, a trade-off relationship exists between the initial discharge capacity and the capacity retention. Therefore, in general, the following relationship exits: a fibrous catalyst A, which is high in initial discharge capacity, is low in capacity retention while a particulate catalyst B, which is high in capacity retention, is low in initial discharge capacity. For this reason, when the fibrous catalyst A and the particulate catalyst B are mixed with each other, the catalyst retention of the whole is expected to be lower as the ratio of the fibrous catalyst A, which is low in capacity retention, becomes larger (FIG. 2B). However, contrarily to the expectation, in the present invention, it has been confirmed that the capacity retention increases specifically. The reason therefore is not known exactly, however, it is presumed that, by arranging the fibrous catalyst so as to bridge between the particulate catalysts, the use efficiency of the catalysts is improved. On the other hand, when the fibrous catalyst A and the particulate catalyst B are mixed with each other, the initial discharge capacity of the whole is expected to be larger as the ratio of the fibrous catalyst A, which is large in initial discharge capacity, becomes larger (FIG. 2C). Also in the present invention, increase of the initial discharge capacity has been confirmed.

As described above, according to the present invention, by setting the ratio of the fibrous catalyst to the above-mentioned range, both high initial discharge capacity and high capacity retention can be achieved. Thereby, an air cathode which can be used at high energy density for a long term can be obtained. Particularly, it is to be noted that, contrarily to the above-mentioned trade-off relationship, the present inventor has found out that both specifically high initial discharge capacity and specifically high capacity retention can be achieved.

Hereinafter, each component of the air cathode of the present invention will be described.

1. Air Cathode Layer

The following will describe the air cathode layer used in the present invention. The air cathode layer used in the present invention is a layer containing at least a conductive material, a particulate catalyst and a fibrous catalyst. The layer may further contain a binder if necessary.

(1) Catalyst

The air cathode layer used in the present invention contains both a particulate catalyst and a fibrous catalyst. First, the particulate catalyst is described herein. Examples of the material of the particulate catalyst may include: inorganic ceramic materials such as $MnO_2$, $CeO_2$, $TiO_2$, $CO_3O_4$, and $Fe_3O_4$; organic complexes such as cobalt phthalocyanine, and iron porphyrin; and composite materials made from two or more thereof. The particulate catalyst in the present invention may be an aggregate. In the present invention, the material of the particulate catalyst is preferably an inorganic ceramic material, more preferably $MnO_2$ since the material is excellent in catalytic function. Examples of the crystal structure of $MnO_2$ may include those of α type, β type, γ type, δ type, λ type and R type (ramsdellite type). In the present invention, it is preferred that the particulate catalyst is α-$MnO_2$ or γ-$MnO_2$.

The particulate catalyst in the present invention is preferably in the order of micrometers since the particulate catalyst can give good capacity retention. Examples of the shape of the particulate catalyst may include spherical, and elliptically spherical shapes. The shape may be checked by use of, for example, a scanning electron microscope (SEM). The average particle diameter of the particulate catalyst is preferably, for example, within the range of 0.5 μm to 50 μm, particularly within the range of 1 μm to 20 μm. The average particle diameter may be calculated out through a laser diffraction type particle size distribution meter. The specific surface area of the particulate catalyst is preferably, for example, within the range of 0.5 $m^2$/g to 50 $m^2$/g, particularly within the range of 1 $m^2$/g to 30 $m^2$/g. The specific surface area may be calculated out by the BET method.

The following will describe the fibrous catalyst used in the present invention. Examples of the material of the fibrous catalyst may include: inorganic ceramic materials such as $MnO_2$, and $TiO_2$; organic complexes such as cobalt phthalocyanine, and iron porphyrin; and composite materials made from two or more thereof. The fibrous catalyst in the present invention may be a tubular compound. In the present invention, the material of the fibrous catalyst is preferably an inorganic ceramic material, more preferably $MnO_2$ since the material is excellent in catalytic function. Examples of the crystal structure of $MnO_2$ may include those of α type, β type, γ type, δ type, λ type and R type, as described above. In the present invention, it is preferred that the fibrous catalyst is α-$MnO_2$ since α-$MnO_2$ is high in shape-selectivity so that fiber can be easily obtained.

In the present invention, the particulate catalyst and the fibrous catalyst may be of the same chemical composition, or may be of the different chemical compositions. In the former case, it appears that the catalytic reaction is easily controlled since the two catalysts are of the same chemical composition. An example of the former may include a case where the particulate catalyst and the fibrous catalyst are each $MnO_2$. On the other hand, in the latter case, by combining the particulate catalyst, which is high in capacity retention, together with the fibrous catalyst, which is high in initial discharge capacity, a higher-performance air cathode can be obtained. An example of the latter may include a case where the particulate catalyst is $CeO_2$ and the fibrous catalyst is α-$MnO_2$.

The fibrous catalyst in the present invention is preferably in the order of nanometers since a good initial discharge capacity can be obtained. The shape of the fibrous catalyst may be checked by use of, for example, a transmission electron microscope (TEM). The average length of the fibrous catalyst is preferably, for example, within the range of 100 nm to 10000 nm, particularly within the range of 500 nm to 5000 nm. The average diameter of the fibrous catalyst is preferably, for example, within the range of 10 nm to 100 nm, particularly within the range of 20 nm to 50 nm. The aspect ratio (length/diameter) of the fibrous catalyst is preferably, for example, in the range of 1 to 1000, particularly within the range of 10 to 250. The specific surface area of the fibrous catalyst is usually larger than the surface area of the above-mentioned particulate catalyst, and is preferably, for example, within the range of 5 $m^2$/g to 100 $m^2$/g, particularly within the range of 10 $m^2$/g to 50 $m^2$/g. The specific surface area may be calculated out by the BET method.

In the present invention, the ratio of the fibrous catalyst to the total weight of the particulate catalyst and the fibrous catalyst is usually 10% by weight or less, preferably 9% by weight or less, more preferably 7% by weight or less. On the other hand, the ratio of the fibrous catalyst is preferably 1% by weight or more, more preferably 2% by weight or more, even more preferably 3% by weight or more. It is preferred in the present invention that the ratio of the fibrous catalyst is a ratio which is capable of exhibiting higher capacity retention than that when the particulate catalyst is used alone. Thereby, both high initial discharge capacity and high capacity retention can be achieved. The ratio of the mixture (mixed catalyst) of the fibrous catalyst and the particulate catalyst in the air cathode layer is preferably, for example, within the range of 1% by weight to 90% by weight. If the content of the mixed catalyst is too small, a sufficient catalyst function may not be exhibited. If the content of the mixed catalyst is too large, the content of the conductive material is relatively decreased so that reaction sites are reduced. Thus, a fall in the battery capacity may be generated.

(2) Conductive Material

The conductive material used in the air cathode layer is not particularly limited as far as the material is a material having electroconductivity. The material may include, for example, carbon material or the like. The carbon material may or may not have a porous structure. However, in the present invention, it is preferred that the carbon material has a porous structure since the specific surface area is large so that many reaction sites can be provided. The carbon material having a porous structure may include, specifically, mesoporous carbon or the like. The carbon material having no porous structure may include, specifically, graphite, acetylene black, carbon nanotube, carbon fiber or the like. It is preferred that the content of the conductive material in the air cathode layer is appropriately selected in accordance with the density and the volume thereof. Specifically, the content of the conductive material is preferably within the range of 10% by weight to 99% by weight. If the content of the conductive material is too small, reaction sites are reduced so that a fall in the battery capacity may be generated. If the content of the conductive material is too large, the content of the catalysts and the binder are relatively decreased so that a desired air cathode layer may not be obtained.

(3) Binder

The air cathode layer used in the present invention may contain a binder for immobilizing the conductive material and the catalysts. Examples of the binder may include fluorine-based binders such as polyvinylidene fluoride (PVDF), polytetrafluoroethylene (PTFE). SBR or some other rubber may be used as the binder. The content of the binder in the air cathode layer is preferably, for example, 40% by weight or less, and particularly within the range of 1% by weight to 10% by weight. If the binder amount is too large, a fall in the battery capacity may be generated. If the binder amount is too small, the conductive material and the catalysts may not be sufficiently immobilized.

(4) Air Cathode Layer

The air cathode layer used in the present invention is a layer containing the above-mentioned conductive material, particulate catalyst, fibrous catalyst and binder. The thickness of the air cathode layer is varied in accordance with the usage and others of the metal-air battery. The thickness is preferably, for example, within the range of 2 μm to 500 μm, particularly within the range of 5 μm to 300 μm.

2. Air Cathode Current Collector

The following will describe the air cathode current collector used in the present invention. The air cathode current collector used in the present invention is a member for collecting current of the air cathode layer. Examples of the material of the air cathode current collector may include metallic materials, and carbon materials. Of these materials, carbon materials are preferred since they are excellent in corrosion resistance. Such a carbon material is preferably, for example, carbon fiber since electrons can be conducted through the fiber so as to exhibit high electron conductivity. Examples of the air cathode current collector using carbon fiber may include a carbon cloth, a carbon paper, a carbon felt and the like. Examples of the metallic material may include stainless steel, nickel, aluminum, iron, titanium and the like. The air cathode current collector using the metallic material may be a metallic mesh or the like.

The structure of the air cathode current collector in the present invention is not particularly limited as far as the structure can ensure desired electron conductivity. The structure may be a porous structure having gas diffusibility or may be a dense structure having no gas diffusibility. In the present invention, it is preferred that the air cathode current collector has a porous structure having gas diffusibility since the diffusion of oxygen can be rapidly attained. The porosity of the porous structure is not particularly limited, and is preferably, for example, within the range of 20% to 99%. The thickness of the air cathode current collector is preferably, for example, within the range of 10 μm to 1000 μm, particularly within the range of 20 μm to 400 μm.

3. Air Cathode

The air cathode of the present invention is used in a metal-air battery. A preferred kind of the metal-air battery will be described in detail in "B. Metal-air battery" given below. Particularly, the air cathode of the present invention is preferably used in a metal-air battery using a nonaqueous electrolyte solution since the catalytic function thereof can be sufficiently exhibited. The method for forming the air cathode of the present invention is not particularly limited as far as the method is a method capable of forming the above-mentioned air cathode. An example of the method for forming the air cathode may be a method wherein: an air cathode layer forming composition containing a conductive material, catalysts, a binder and a solvent is initially prepared; and then, this composition is applied onto an air cathode current collector, and dried. Examples of the solvent may include acetone, DMF (N,N-dimethylformamide), NMP (N-methylpyrrolidone) and the like. The boiling point of the solvent is preferably 200° C. or lower, since the drying becomes easy.

B. Metal-Air Battery

The following will describe the metal-air battery of the present invention. The metal-air battery of the present invention is a battery comprising: the above-mentioned air cathode; an anode having an anode layer containing an anode active material, and an anode current collector for collecting current of the anode layer; and an electrolyte for conducting metal ions between the air cathode layer and the anode layer.

Figure 3:
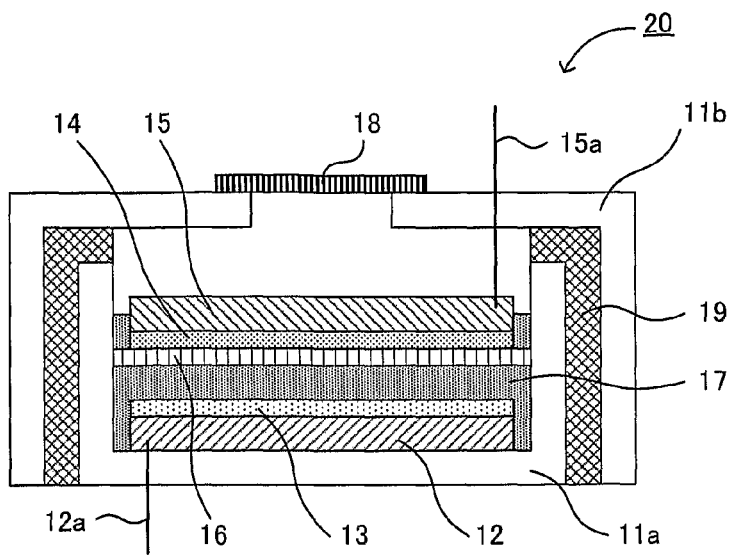
FIG. 3 is a schematic sectional view showing an example of the metal-air battery of the present invention.

FIG. 3 is a schematic sectional view showing an example of the metal-air battery of the present invention. An metal-air battery 20 shown in FIG. 3 comprises: an anode case 11a; an anode current collector 12 formed on the inner bottom surface of the anode case 11a; an anode lead 12a connected to the anode current collector 12; an anode layer 13 formed on the anode current collector 12 and containing an anode active material; an air cathode layer 14; an air cathode current collector 15 for collecting current of the air cathode layer 14; an air cathode lead 15a connected to the air cathode current collector 15; a separator 16 arranged between the anode layer 13 and the air cathode layer 14; a nonaqueous electrolyte solution 17; an air cathode case 11b having a microporous membrane 18; and a packing 19 formed between the anode case 11a and the air cathode case 11b. The present invention is largely characterized in that the above-mentioned air cathode is used as the air cathode including the air cathode layer 14 and the air cathode current collector 15.

According to the present invention, by using the above-mentioned air cathode in this manner, a metal-air battery that can be used at high energy density for a long term can be obtained.

Each component of the metal-air battery of the present invention will be described hereinafter.

1. Air Cathode

The description concerning the air cathode used in the present invention is equivalent to that described in the above-mentioned item "A. Air cathode". Thus, description thereof is omitted herein.

2. Anode

The following will describe the anode used in the present invention. The anode used in the present invention is an electrode having an anode layer containing an anode active material, and an anode current collector for collecting current of the anode layer.

The anode layer used in the present invention is a layer containing at least an anode active material. The anode active material usually contains a metal element which will be a metal ion to be conducted. Examples of the metal element may include: alkali metal elements such as Li, Na and K; alkaline earth metal elements such as Mg and Ca; amphoteric metal elements such as Al and Zn; and transition metal elements such as Fe. In the present invention, the metal element is preferably an alkali metal element or an alkaline earth metal element, more preferably an alkali metal element, and particularly Li since a battery high in energy density can be obtained. Specific examples of the anode active material may include simplex metals, alloys, metallic oxides, metallic nitrides and the like.

Examples of an alloy having a lithium element may include lithium aluminum alloy, lithium tin alloy, lithium lead alloy, lithium silicon alloy and the like. An example of a metallic oxide having a lithium element may include lithium titanium oxide and the like. Examples of a metallic nitride containing a lithium element may include lithium cobalt nitride, lithium iron nitride, lithium manganese nitride and the like.

The anode layer in the present invention may contain only an anode active material, or may contain at least one of a conductive material and a binder besides an anode active material. When the anode active material is, for example, in the form of foil, the anode layer may be rendered an anode layer containing only the anode active material. When the anode active material is, for example, powdery, the anode layer may be rendered an anode layer containing the anode active material and a binder. About the conductive material and the binder, the contents thereof are equivalent to those described in the item "A. Air cathode". Thus, description thereof is omitted herein. It is preferred to select the thickness of the anode layer appropriately in accordance with the structure of the target metal-air battery.

The anode current collector used in the present invention is a member for collecting current of the anode layer. The material of the anode current collector is not particularly limited as far as the material is conductive. Examples thereof may include copper, stainless steel, nickel, carbon and the like. Examples of the shape of the anode current collector may include a foil form, a plate form, a mesh (grid) form and the like. In the present invention, a battery case, which will be described later, may function also as the anode current collector.

The method for forming the anode in the present invention is not particularly limited as far as the method is a method capable of forming the above-mentioned anode. An example of the method for forming the anode may include a method wherein: a foil-form anode active material is placed on an anode current collector, and pressed. Another example of the method for forming the anode may include a method wherein: an anode layer forming composition containing an anode active material and a binder is prepared; and then, this composition is applied onto an anode current collector, and dried.

3. Electrolyte

The following will describe the electrolyte used in the present invention. The electrolyte used in the present invention is a material for conducting metal ions between the air cathode layer and the anode layer. The kind of the metal ions is varied in accordance with the kind of the above-mentioned anode active material. The form of the electrolyte is not particularly limited as far as the form permits the electrolyte to have metal ion conductivity. Examples thereof may include an electrolyte solution (water-contained electrolyte solution or nonaqueous electrolyte solution), a gel electrolyte (water-contained gel electrolyte or nonaqueous gel electrolyte), polymer electrolytes, inorganic solid electrolytes and the like. In the present invention, it is preferred to use the electrolyte not containing water. Specifically, it is preferred that the electrolyte is a nonaqueous electrolyte solution, a nonaqueous gel electrolyte, a polymer electrolyte or an inorganic solid electrolyte.

It is preferred to select the kind of the nonaqueous electrolyte solution used in the present invention appropriately in accordance with the kind of the metal ions to be conducted. For example, the nonaqueous electrolyte solution of a lithium-air battery usually contains a lithium salt and an organic solvent. Examples of the lithium salt may include; inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_6SO_2)_2$, and $LiC(CF_3SO_2)_3$. Examples of the organic solvent may include ethylene carbonate (EC), propylene carbonate (PC), dimethyl carbonate (DMC), diethyl carbonate (DEC), ethylmethyl carbonate (EMC), butylene carbonate, γ-butyrolactone, sulfolane, acetonitrile, 1,2-dimethoxymethane, 1,3-dimethoxypropane, diethyl ether, tetrahydrofuran and 2-methyltetrahydrofuran, mixtures thereof and the like. The organic solvent is preferably a solvent high in oxygen solubility since dissolved oxygen can be effectively used for reaction. The concentration of the lithium salt in the nonaqueous electrolyte solution is, for example, within the range of 0.5 mol/L to 3 mol/L. In the present invention, for example, a low volatile liquid such as an ionic liquid can be used as the nonaqueous electrolyte solution.

It is preferred that the metal-air battery of the present invention has a separator for holding the nonaqueous electrolyte solution between the air cathode layer and the anode layer since the resultant battery can gain higher safety. Examples of the separator may include: a porous membrane of polyethylene, polypropylene or the like; and nonwoven fabric such as resin nonwoven fabric and glass fiber nonwoven fabric.

The nonaqueous gel electrolyte used in the present invention is usually a product obtained through gelatinization by adding a polymer to a nonaqueous electrolyte solution. For example, a nonaqueous gel electrolyte of a lithium-air battery may be obtained through gelatinization by adding a polymer such as polyethylene oxide (PEO), polyacrylonitrile (PAN), polymethyl methacrylate (PMMA) or the like to the above-mentioned nonaqueous electrolyte solution. In the present invention, preferred is a LiTFSI($LiN(CF_3SO_2)_2$)-PEO based nonaqueous gel electrolyte.

It is preferred to select the polymer electrolyte used in the present invention appropriately in accordance with the kind of the metal ions to be conducted. An example of the inorganic solid electrolyte used in the present invention may include an inorganic solid electrolyte of Li—La—Ti—O type. In the present invention, pressure may be applied to the inorganic solid electrolyte to shape the electrolyte into a solid electrolyte layer, and the layer may be arranged between the air cathode layer and the anode layer.

4. Battery Case

The following will describe a battery case used in the present invention. The shape of the battery case used in the present invention is not particularly limited as far as it can store the above-mentioned air cathode, anode, and electrolyte. Specific examples thereof may include a coin form, a flat plate form, a cylindrical form, a laminate form and the like. The battery case may be an open-to-atmosphere battery case, or a closed battery case. The open-to-atmosphere case is a battery case contactable with the atmosphere, as shown in FIG. 3. When the battery case is a closed battery case, it is preferred to provide a pipe for supplying a gas (air), and a pipe for discharging the gas to the closed battery case. In this case, the gas to be supplied and discharged is preferably a gas high in oxygen concentration, and is more preferably pure oxygen. It is also preferred that the oxygen concentration therein is made high when the battery is discharged while the oxygen concentration is made low when the battery is charged.

5. Metal-Air Battery

The kind of the metal-air battery of the present invention is varied in accordance with the kind of the metal ions to be conducted. The metal-air battery is preferably a lithium-air battery, a sodium-air battery, or a potassium-air battery, and is particularly a lithium-air battery. The metal-air battery of the present invention may be a primary battery or a secondary battery. The metal-air battery of the present invention may be used, for example, for being mounted onto a vehicle, for a stationary power source, for a household power source, or the like. The method for producing the metal-air battery of the present invention is not particularly limited, and is equivalent to a method for producing an ordinary metal-air battery.

The present invention is not limited to the above-described embodiments. The above embodiments are mere illustrative, and the present invention encompasses any embodiments that have substantially the same constitution and exhibit the same working effect as by the technical idea described in the claims in the present application.

EXAMPLES

The present invention will be more specifically described by way of the following examples.

Example 1

In the present example, a cell for evaluating a lithium-air secondary battery was formed. The fabrication of the cell was performed inside an argon box. A battery case of an electrochemical cell manufactured by Hokuto Denko Corp. was used.

First, a metallic Li piece (manufactured by Honjo Metal Co., Ltd., diameter: 18 mm, thickness: 0.25 mm) was arranged in the battery case. Next, a separator made of polyethylene (diameter: 18 mm, thickness: 25 µm) was arranged on the metallic Li. Next, 4.8 mL of a nonaqueous electrolyte solution, wherein $LiClO_4$ (manufactured by Kishida Chemical Co., Ltd.) was dissolved in propylene carbonate (PC, manufactured by Kishida Chemical Co., Ltd.) to give a concentration of 1 M, was poured onto the separator.

Next, prepared were: a particulate catalyst (electrolyte manganese dioxide, $\gamma$-$MnO_2$, manufactured by Mitsui Mining and Smelting Co., Ltd., average particle diameter: 15 µm, specific surface area: 20.6 m$^2$/g); and a fibrous catalyst (synthesized by a solution method, $\alpha$-$MnO_2$, average particle diameter: 30 nm, average length: 300 nm, specific surface area: 22 m$^2$/g). Next, a mixed catalyst was obtained by mixing these with each other in such a way that the ratio by weight of the particulate catalyst to the fibrous catalyst is 99 to 1. Next, an air cathode layer (diameter: 18 mm, weight per unit area: 5 mg) was formed by applying a composition onto a carbon paper (air cathode current collector TGP-H-090, manufactured by Toray Industries, Inc., diameter: 18 mm, thickness: 0.28 mm) with a doctor blade. The applied composition contained: 25 parts by weight of carbon black; 42 parts by weight of the mixed catalyst; 33 parts by weight of polyvinylidene fluoride (PVDF); and acetone as a solvent. Next, thus obtained air cathode layer of the air cathode was arranged to be opposed to the separator, and then the resultant was sealed so as to obtain an evaluating cell.

Examples 2 to 5

Evaluating cells were obtained in the same way as in Example 1 except that the ratio of the fibrous catalyst in the mixed catalyst was changed to 3% by weight, 5% by weight, 7% by weight, and 10% by weight, respectively.

Comparative Example 1

An evaluating cell was obtained in the same way as in Example 1 except that the ratio of the fibrous catalyst in the mixed catalyst was changed to 0% by weight.

[Evaluation]

By using the evaluating cells obtained in Examples 1 to 5 and Comparative Example 1, charge-discharge evaluations were carried out. First, the evaluating cells were each placed in a desiccator (oxygen concentration: 99.99% by volume, internal pressure: 1 atm., desiccator volume: 1 L) filled with oxygen. Thereafter, the cells were subjected to 5 cycles of break-in (adjusting-driving) under conditions that the cut voltage was 2.0 V-4.3 V and the current density was 0.02 mA/cm$^2$. Thereafter, under the same conditions, the cells were charged and discharged for 5 cycles at a constant current. The results are shown in Table 1, and FIGS. 4 and 5. In Table 1, "g-C" denotes the weight of carbon black.

TABLE 1

| | $\alpha$-$MnO_2$ Content (wt %) | Initial Discharge Capacity After Break-in (mAh/g-C) | Capacity After 5 Cycles (mAh/g-C) | Capacity Retention $R_{5/1}$ (%) |
|---|---|---|---|---|
| Comparative Example 1 | 0 | 1641 | 1365 | 83 |
| Example 1 | 1 | 2249 | 1792 | 80 |
| Example 2 | 3 | 2274 | 1958 | 86 |
| Example 3 | 5 | 2325 | 2172 | 93 |
| Example 4 | 7 | 1928 | 1735 | 90 |
| Example 5 | 10 | 1375 | 1200 | 87 |

Figure 4:
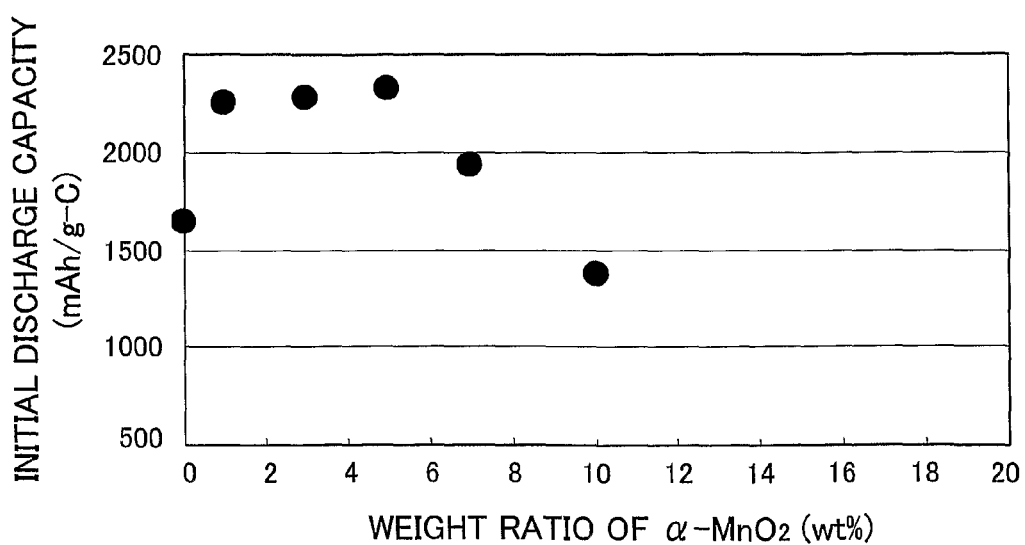
FIG. 4 is a graph showing a relationship between the weight ratio of $\alpha$-$MnO_2$ and the initial discharge capacity.
Figure 5:
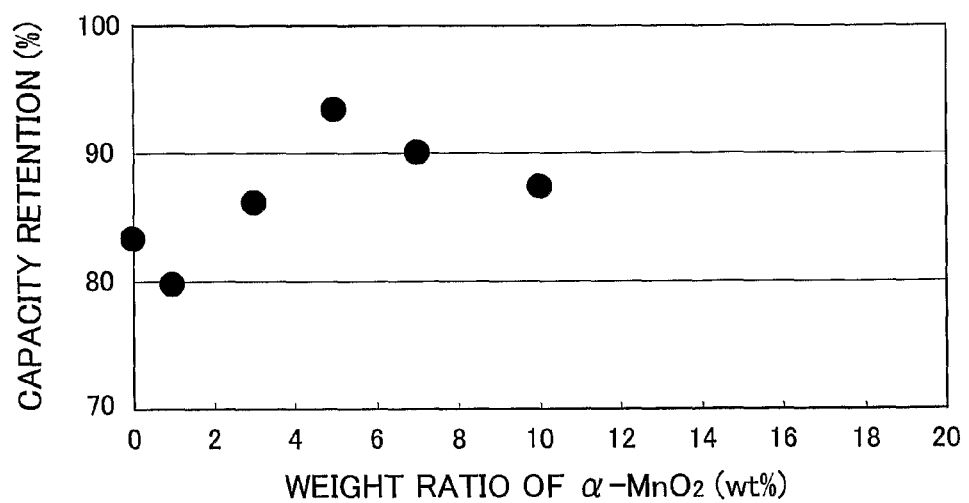
FIG. 5 is a graph showing a relationship between the weight ratio of $\alpha$-$MnO_2$ and the capacity retention.

As shown in Table 1 and FIGS. 4 and 5, in Example 5, $\alpha$-$MnO_2$, which is low in capacity retention, was added in an amount of 10% by weight. However, the capacity retention of the whole thereof was better than that in Comparative Example 1. Further, the capacity retention in Example 1 was same degree as that in Comparative Example 1, while the initial discharge capacity therein was largely increased from that in Comparative Example 1. It was verified that in Examples 2 to 4, both the initial discharge capacity and the capacity retention were better than that in Comparative Example 1.

| Explanation of References | |
|---|---|
| 1 | Air cathode layer |
| 2 | Air cathode current collector |
| 10 | Air cathode |

The invention claimed is:

1. An air cathode used in a metal-air battery, comprising:
an air cathode layer containing a conductive material, a particulate catalyst and a fibrous catalyst; and
an air cathode current collector for collecting current of the air cathode layer,
wherein the ratio of the fibrous catalyst to the total weight of the particulate catalyst and the fibrous catalyst is 10% by weight or less, and
the particulate catalyst is $\gamma$-$MnO_2$, and the fibrous catalyst is $\alpha$-$MnO_2$.

2. The air cathode according to claim 1, wherein the ratio of the fibrous catalyst to the total weight of the particulate catalyst and the fibrous catalyst is within the range of 2% by weight to 9% by weight.

3. A metal-air battery, comprising:
an air cathode according to claim 1;
an anode having an anode layer containing an anode active material, and an anode current collector for collecting current of the anode layer; and
an electrolyte for conducting metal ions between the air cathode layer and the anode layer.

4. A metal-air battery, comprising:
an air cathode according to claim 2;
an anode having an anode layer containing an anode active material, and an anode current collector for collecting current of the anode layer; and
an electrolyte for conducting metal ions between the air cathode layer and the anode layer.

* * * * *